US009069951B2

(12) United States Patent
Cudak et al.

(10) Patent No.: US 9,069,951 B2
(45) Date of Patent: *Jun. 30, 2015

(54) INFERRING SECURITY DECISIONS FROM TRUSTED USERS

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,243

(22) Filed: Aug. 8, 2013

(65) Prior Publication Data

US 2014/0189849 A1 Jul. 3, 2014

Related U.S. Application Data

(63) Continuation of application No. 13/729,613, filed on Dec. 28, 2012.

(51) Int. Cl.
*G06F 7/04* (2006.01)
*G06F 21/51* (2013.01)
(Continued)

(52) U.S. Cl.
CPC .............. *G06F 21/51* (2013.01); *G06F 21/316* (2013.01); *G06F 21/44* (2013.01); *G06F 21/57* (2013.01)

(58) Field of Classification Search
CPC .......... G06F 21/31; G06F 21/83; G06F 21/53
USPC .......................................................... 726/16
See application file for complete search history.

(56) References Cited

U.S. PATENT DOCUMENTS 8,234,231 B2 7/2012 Kelly
2003/0182161 A1* 9/2003 Vanderlei et al. ................ 705/2
(Continued)

FOREIGN PATENT DOCUMENTS

WO WO 2011/032069 A2 3/2011

OTHER PUBLICATIONS

Pan, W., et al., "Composite Social Network for Predicting Mobile Apps Installation", 25th Conference on Artificial Intelligence (AAAI-11), Aug. 2011, pp. 1-7, Association for the Advancement of Artificial Intelligence (aaai.org), USA.
(Continued)

*Primary Examiner* — Teshome Hailu
(74) *Attorney, Agent, or Firm* — Edward J. Lenart; Katherine S. Brown; Kennedy Lenart Spraggins LLP

(57) ABSTRACT

Inferring security decisions from trusted users, including: identifying, by a security inference module on a computing device, a candidate application to be installed on the computing device; identifying, by the security inference module, one or more trusted users; identifying, by the security inference module, trusted user installation activity associated with the candidate application; and determining, by the security inference module, whether to install the candidate application in dependence upon the trusted user installation activity associated with the candidate application.

7 Claims, 4 Drawing Sheets

(51) Int. Cl.
*G06F 21/31* (2013.01)
*G06F 21/44* (2013.01)
*G06F 21/57* (2013.01)

(56) References Cited

U.S. PATENT DOCUMENTS

| | | | |
|---|---|---|---|
| 2004/0207601 A1* | 10/2004 | SanGiovanni | 345/156 |
| 2006/0230433 A1* | 10/2006 | Chang | 726/3 |
| 2007/0038677 A1* | 2/2007 | Reasor et al. | 707/200 |
| 2008/0134053 A1 | 6/2008 | Fischer | |
| 2009/0228559 A1* | 9/2009 | Campbell et al. | 709/206 |
| 2010/0005291 A1* | 1/2010 | Hulten et al. | 713/156 |
| 2010/0058468 A1* | 3/2010 | Green et al. | 726/22 |
| 2012/0066346 A1* | 3/2012 | Virmani et al. | 709/219 |
| 2012/0072283 A1 | 3/2012 | Devore et al. | |
| 2012/0116905 A1 | 5/2012 | Futty et al. | |
| 2012/0272290 A1* | 10/2012 | Zaitsev et al. | 726/1 |

OTHER PUBLICATIONS

Eterović, T., et al., "Using Social Network Services As An Input For A Trust Clustered—Collaborative Filtering Recommendation System", 9th World Scientific and Engineering Academy and Society (WSEAS) International Conference on Data Networks, Communications, Computers (DNCOCO'10)—"Advances in Data Networks, Communications, Computers", Nov. 2010, pp. 101-104, WSEAS Press, ISBN: 978-960-474-245-5.

* cited by examiner

INFERRING SECURITY DECISIONS FROM TRUSTED USERS

CROSS-REFERENCE TO RELATED APPLICATION

This application is a continuation application of and claims priority from U.S. patent application Ser. No. 13/729,613, filed on Dec. 28, 2012.

BACKGROUND OF THE INVENTION

1. Field of the Invention

The field of the invention is data processing, or, more specifically, methods, apparatus, and products for inferring security decisions from trusted users.

2. Description of Related Art

Modern computing devices such as laptop computers, personal computers, smartphones, and tablet computers can install applications on the computing device for carrying out a specialized activity. Application installs can be risky in that they can provide a method of entry for certain individuals to take personal information from the computing device. This is very common in the smart phone industry where frequent installation of applications is a common practice for many users. Some users, particularly less technical users, struggle with decisions regarding usage of a system or mobile device in regards to settings and application installs. Generally these users will have more technical friends that they trust and will ask for guidance or advice regarding an application install. These users, however, may not be able to reach their more technical friends at times when they plan to install the application.

SUMMARY OF THE INVENTION

Methods, apparatus, and products for inferring security decisions from trusted users, including: identifying, by a security inference module on a computing device, a candidate application to be installed on the computing device; identifying, by the security inference module, one or more trusted users; identifying, by the security inference module, trusted user installation activity associated with the candidate application; and determining, by the security inference module, whether to install the candidate application in dependence upon the trusted user installation activity associated with the candidate application.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
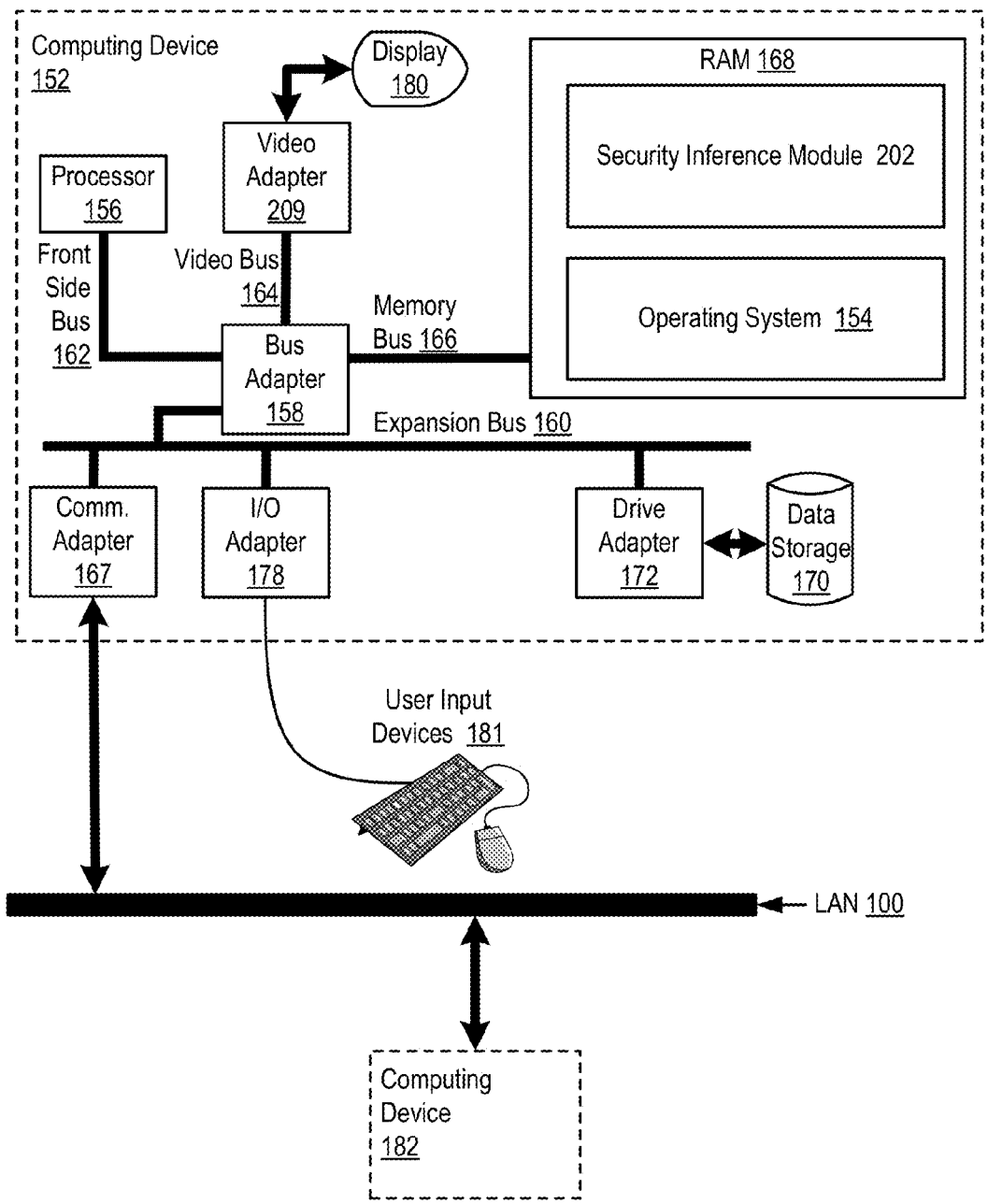
FIG. 1 sets forth a block diagram of automated computing machinery comprising an example computer useful in inferring security decisions from trusted users according to embodiments of the present invention.

Example methods, apparatus, and products for inferring security decisions from trusted users in accordance with the present invention are described with reference to the accompanying drawings, beginning with FIG. 1. FIG. 1 sets forth a block diagram of automated computing machinery comprising an example computing device (152) useful in inferring security decisions from trusted users according to embodiments of the present invention. The computing device (152) of FIG. 1 includes at least one computer processor (156) or 'CPU' as well as random access memory (168) ('RAM') which is connected through a high speed memory bus (166) and bus adapter (158) to processor (156) and to other components of the computing device (152).

Stored in RAM (168) is a security inference module (202), a module of computer program instructions improved for inferring security decisions from trusted users according to embodiments of the present invention. Security decisions can include a decision to install or not to install a particular application on the computing device (152). The decision to install or not install a particular application on the computing device (152) is a 'security decision' because the particular application that is installed on the computing device (152) may serve as a method of entry for the creator of the application to capture personal information. For example, the decision to install an application may enable the creator of the application to capture personal information such as a credit card number that is used to make purchases using the application, information such as the global positioning system ('GPS') coordinates of the device, and so on.

The user of the computing device (152) may struggle with the decision to install a particular application on their computing device (152). The user of the computing device (152), however, may have more technically savvy friends or contacts that the user trusts and can seek guidance or advice from regarding an application install. In such an example, these more technically savvy friends or contacts can be 'trusted users' as their opinion regarding various security decisions may be trusted by the user of the computing device (152). Such a computing device (152) may be embodied as a personal computer, mobile communications device, smartphone, tablet computer, laptop computer, and so on. Such a computing device (152) can include a computer processor or other computer hardware capable of executing computer program instructions.

In the example of FIG. 1, the security inference module (202) can infer security decisions from trusted users by identifying a candidate application to be installed on the computing device (152). The candidate application to be installed on the computing device (152) represents a particular application that the user of the computing device (152) is considering installing on the computing device (152). Identifying a candidate application to be installed on the computing device (152) may be carried out, for example, by detecting that the user of the computing device (152) has selected a particular application from an application repository. Consider an example in which the computing device (152) is a smartphone that can access an application store that contains applications that are available to be installed on the smartphone. In such an example, identifying a candidate application to be installed on the computing device (152) may be carried out by detecting that the user of the smartphone has accessed the application store and has selected a particular application to learn more information about.

In the example of FIG. 1, the security inference module (202) can further infer security decisions from trusted users by identifying one or more trusted users. Identifying one or more trusted users may be carried out, for example, by examining a trusted user repository stored in computer memory of the computing device (152). The trusted user repository may include information identifying trusted users that have been identified, for example, through a user interface presented to the user of the computing device (152) by the security inference module (202). Such a user interface can allow a user of the computing device (152) to identify one or more trusted users, one or more computing devices utilized by the trusted users, categories of applications for which a particular trusted user is trusted, and so on.

Consider the example described above in which the computing device is a smartphone that can access an application store that contains applications that are available to be installed on the smartphone. In such an example, the user of such a smartphone may be presented with a user interface through which the user of the smartphone may identify trusted users. The user interface may allow the user of the smartphone to identify, for example, the name of one or more trusted users, the phone number of a smartphone used by one or more trusted users, a username for the application store of one or more trusted users, and so on.

In the example of FIG. 1, the security inference module (202) can further infer security decisions from trusted users by identifying trusted user installation activity associated with the candidate application. The trusted user installation activity can include information identifying, for example, whether a trusted user has installed the candidate application on their computing device, information identifying the particular settings that the trusted user enabled on the candidate application when the trusted user installed the candidate application on their computing device, information identifying whether the trusted user uninstalled the candidate application on their computing device, information identifying whether the trusted user viewed information about the candidate application and subsequently chose not to install the candidate application on their computing device, whether the trusted user provided a review of the candidate application, and so on. Identifying trusted user installation activity associated with the candidate application may be carried out, for example, by the security inference module (202) receiving trusted user installation activity from a trusted user's computing device and storing such information in a repository contained in memory on the computing device (152).

Consider the example described above in which the computing device (152) is a smartphone that can access an application store that contains applications that are available to be installed on the smartphone. In such an example, a trusted user may also have a smartphone that can access the application store. In such an example, each time the trusted user installs an application from the application store, the trusted user's smartphone can communicate trusted user installation activity to the computing device (152). Similarly, each time the trusted user uninstalls an application, the trusted user's smartphone can communicate trusted user installation activity to the computing device (152). In such a way, the trusted user is a willing participant that can provide trusted user installation activity to the computing device (152), so that the user of the computing device (152) can gain knowledge indicating whether the trusted user installed a candidate application, whether the trusted user uninstalled the candidate application, what settings the trusted user selected with installing the candidate application, and so on.

In the example of FIG. 1, the security inference module (202) can further infer security decisions from trusted users by determining whether to install the candidate application in dependence upon the trusted user installation activity associated with the candidate application. Determining whether to install the candidate application in dependence upon the trusted user installation activity associated with the candidate application may be carried out, for example, by determining whether a predetermined percentage of trusted users have installed the candidate application, by determining that no more than a predetermined percentage of trusted users have uninstalled the candidate application, by determining that no more than a predetermined percentage of trusted users have viewed information about the candidate application and did not install the candidate application, by determining whether a predetermined percentage of trusted users have provided a review of the candidate application, or any combination thereof. In such a way, the security inference module (202) can effectively determine whether the trusted users would recommend installing the candidate application by virtue of the trusted users behavior as it relates to installing the candidate application.

Also stored in RAM (168) is an operating system (154). Operating systems useful inferring security decisions from trusted users according to embodiments of the present invention include UNIX™, Linux™, Microsoft XP™, Microsoft Windows 7™, Microsoft Windows 8™, AIX™, IBM's i5/OS™, Android OS, Apple iOS, and others as will occur to those of skill in the art. The operating system (154) and the security inference module (202) in the example of FIG. 1 are shown in RAM (168), but many components of such software typically are stored in non-volatile memory also, such as, for example, on a disk drive (170).

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computers for inferring security decisions from trusted users according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, touchscreen displays, as well as user input from user input devices (181) such as keyboards, mice, touchscreen displays, and others as will occur to those of skill in the art. The example computing device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing device (152) of FIG. 1 includes a communications adapter (167) for data communications with other computers (182), such as a trusted user's computing device, and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for inferring security decisions from trusted users according to embodiments of the present invention include modems for wired dial-up communications, Ethernet (IEEE 802.3) adapters for wired data communications network communications, telecommunications networks such as long term evolution ('LTE') networks, 802.11 adapters for wireless data communications network communications, and so on.

Figure 2:
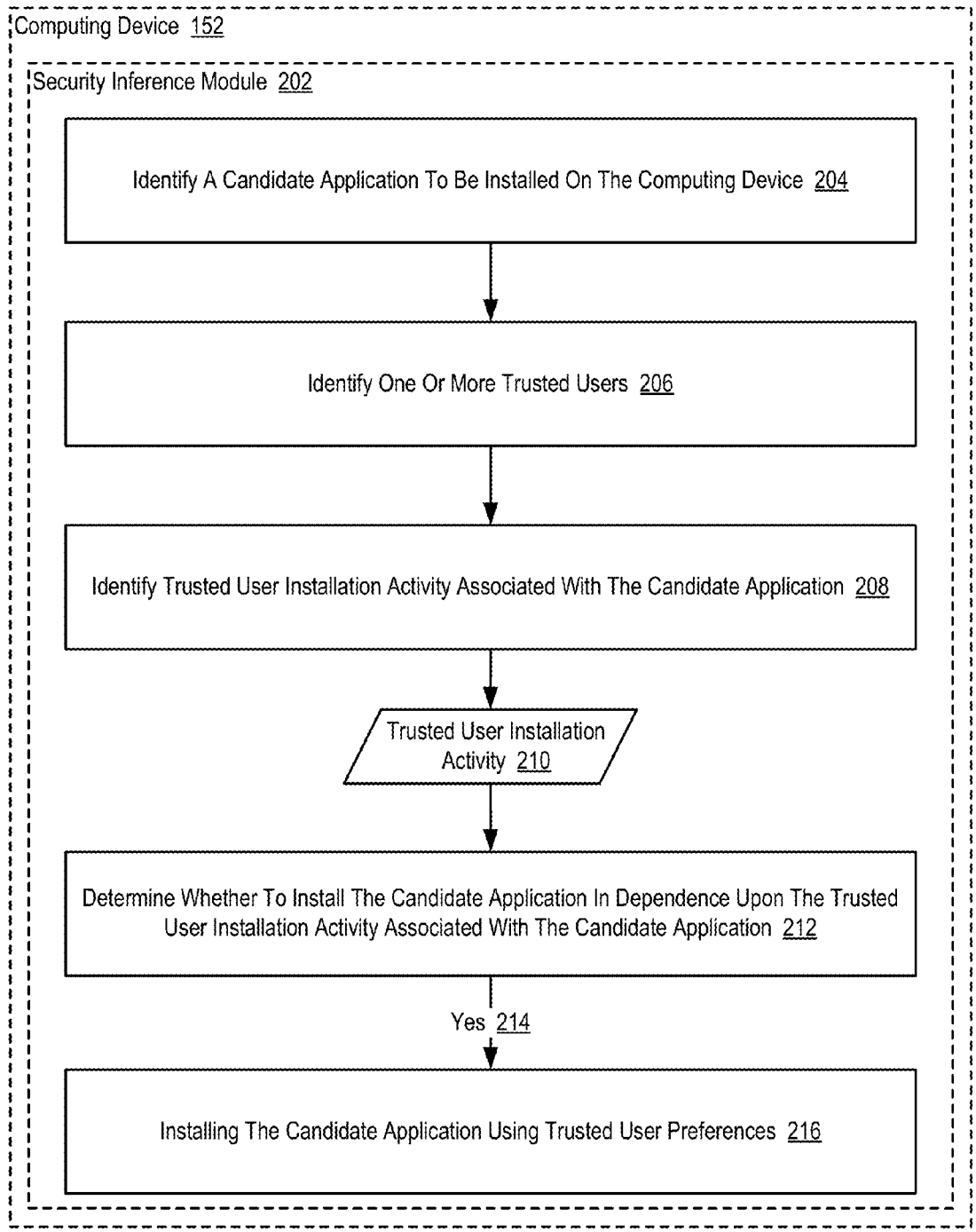
FIG. 2 sets forth a flow chart illustrating an example method for inferring security decisions from trusted users according to embodiments of the present invention.

For further explanation, FIG. 2 sets forth a flow chart illustrating an example method for inferring security decisions from trusted users according to embodiments of the present invention. In the example method of FIG. 2, security decisions can include a decision to install or not to install a particular application on the computing device (152). The decision to install or not install a particular application on the computing device (152) is a 'security decision' because the particular application that is installed on the computing device (152) may serve as a method of entry for the creator of the application to capture personal information. For example, the decision to install an application may enable the creator of the application to capture personal information such as a credit card number that is used to make purchases using the application, information such as the GPS coordinates of the device, and so on.

In the example method of FIG. 2, a particular user may struggle with the decision to install a particular application on their computing device (152). The user may have more technically savvy friends or contacts that the user trusts and will ask for guidance or advice regarding an application install. In such an example, these more technically savvy friends or contacts can be 'trusted users' as their opinion regarding various security decisions may be trusted by the user of the computing device (152).

In the example method of FIG. 2, inferring security decisions from trusted users is carried out by a security inference module (202). The security inference module (202) of FIG. 2 may be embodied, for example, as computer program instructions executing on a computer processor within the computing device (152). Such a computing device (152) may be embodied as a personal computer, mobile communications device, smartphone, tablet computer, laptop computer, and so on. Such a computing device (152) can include a computer processor or other computer hardware capable of executing computer program instructions.

The example method of FIG. 2 includes identifying (204), by the security inference module (202) on the computing device (152), a candidate application to be installed on the computing device (152). In the example method of FIG. 2, the candidate application to be installed on the computing device (152) represents a particular application that the user of the computing device (152) is considering installing on the computing device (152). In the example method of FIG. 2, identifying (204) a candidate application to be installed on the computing device (152) may be carried out, for example, by detecting that the user of the computing device (152) has selected a particular application from an application repository. Consider an example in which the computing device (152) is a smartphone that can access an application store that contains applications that are available to be installed on the smartphone. In such an example, identifying (204) a candidate application to be installed on the computing device (152) may be carried out by detecting that the user of the smartphone has accessed the application store and has selected a particular application to learn more information about.

The example method of FIG. 2 also includes identifying (206), by the security inference module (202), one or more trusted users. In the example method of FIG. 2, identifying (206) one or more trusted users may be carried out, for example, by examining a trusted user repository stored in computer memory of the computing device (152). The trusted user repository may include information identifying trusted users that have been identified, for example, through a user interface presented to the user of the computing device (152) by the security inference module (202). Such a user interface can allow a user of the computing device (152) to identify one or more trusted users, one or more computing devices utilized by the trusted users, categories of applications for which a particular trusted user is trusted, and so on.

Consider the example described above in which the computing device is a smartphone that can access an application store that contains applications that are available to be installed on the smartphone. In such an example, the user of such a smartphone may be presented with a user interface through which the user of the smartphone may identify trusted users. The user interface may allow the user of the smartphone to identify, for example, the name of one or more trusted users, the phone number of a smartphone used by one or more trusted users, a username for the application store of one or more trusted users, and so on.

The example method of FIG. 2 also includes identifying (208), by the security inference module (202), trusted user installation activity (210) associated with the candidate application. The trusted user installation activity (210) of FIG. 2 can include information identifying, for example, whether a trusted user has installed the candidate application on their computing device, information identifying the particular settings that the trusted user enabled on the candidate application when the trusted user installed the candidate application on their computing device, information identifying whether the trusted user uninstalled the candidate application on their computing device, information identifying whether the trusted user viewed information about the candidate application and subsequently chose not to install the candidate application on their computing device, whether the trusted use provided a review of the candidate application, and so on. Trusted user installation activity (210) may also include an identification of various preferences that a trusted user selected when installing the candidate application. Examples such of such preferences can include, for example, whether the candidate application is allowed access to GPS services, whether the candidate application is granted to a user's contacts list, and so on. In the example method of FIG. 2, identifying (208) trusted user installation activity (210) associated with the candidate application may be carried out, for example, by the security inference module (202) receiving trusted user installation activity (210) from a trusted user's computing device and storing such information in a repository contained in memory on the computing device (152).

Consider the example described above in which the computing device (152) is a smartphone that can access an application store that contains applications that are available to be installed on the smartphone. In such an example, a trusted user may also have a smartphone that can access the application store. In such an example, each time the trusted user installs an application from the application store, the trusted user's smartphone can communicate trusted user installation activity (210) to the computing device (152). Similarly, each time the trusted user uninstalls an application, the trusted user's smartphone can communicate trusted user installation activity (210) to the computing device (152). In such a way, the trusted user is a willing participant that can provide trusted user installation activity (210) to the computing device (152), so that the user of the computing device (152) can gain knowledge indicating whether the trusted user installed a candidate application, whether the trusted user uninstalled the candidate application, what settings the trusted user selected with installing the candidate application, and so on.

The example method of FIG. 2 includes determining (212), by the security inference module (202), whether to install the candidate application in dependence upon the trusted user installation activity (210) associated with the candidate application. In the example method of FIG. 2, determining (212) whether to install the candidate application in dependence upon the trusted user installation activity (210) associated with the candidate application may be carried out, for example, by determining whether a predetermined percentage of trusted users have installed the candidate application, by determining that no more than a predetermined percentage of trusted users have uninstalled the candidate application, by determining that no more than a predetermined percentage of trusted users have viewed information about the candidate application and did not install the candidate application, by determining whether a predetermined percentage of trusted users have provided a review of the candidate application, or any combination thereof. In such a way, the security inference module (202) can effectively determine whether the trusted users would recommend installing the candidate application by virtue of the trusted users behavior as it relates to installing the candidate application.

The example method of FIG. 2 also includes installing (216) the candidate application using trusted user preferences. In the example method of FIG. 2, installing (216) the candidate application using trusted user preferences occurs in response to affirmatively (214) determining to install the candidate application. In such an example, the trusted user preferences may be embodied as security settings or other preferences utilized by one or more trusted users when installing the candidate application on the trusted user's computing device, security settings or other preferences explicitly endorsed by one or more trusted users, security settings or other preferences utilized by one or more trusted users when installing similar applications to the candidate application on the trusted user's computing device, and so on. The trusted user preferences may include preferences identifying whether the candidate application can access a user's contacts list on the computing device (152), information identifying whether the candidate application can access a network connection accessible by the computing device (152), and so on.

Figure 3:
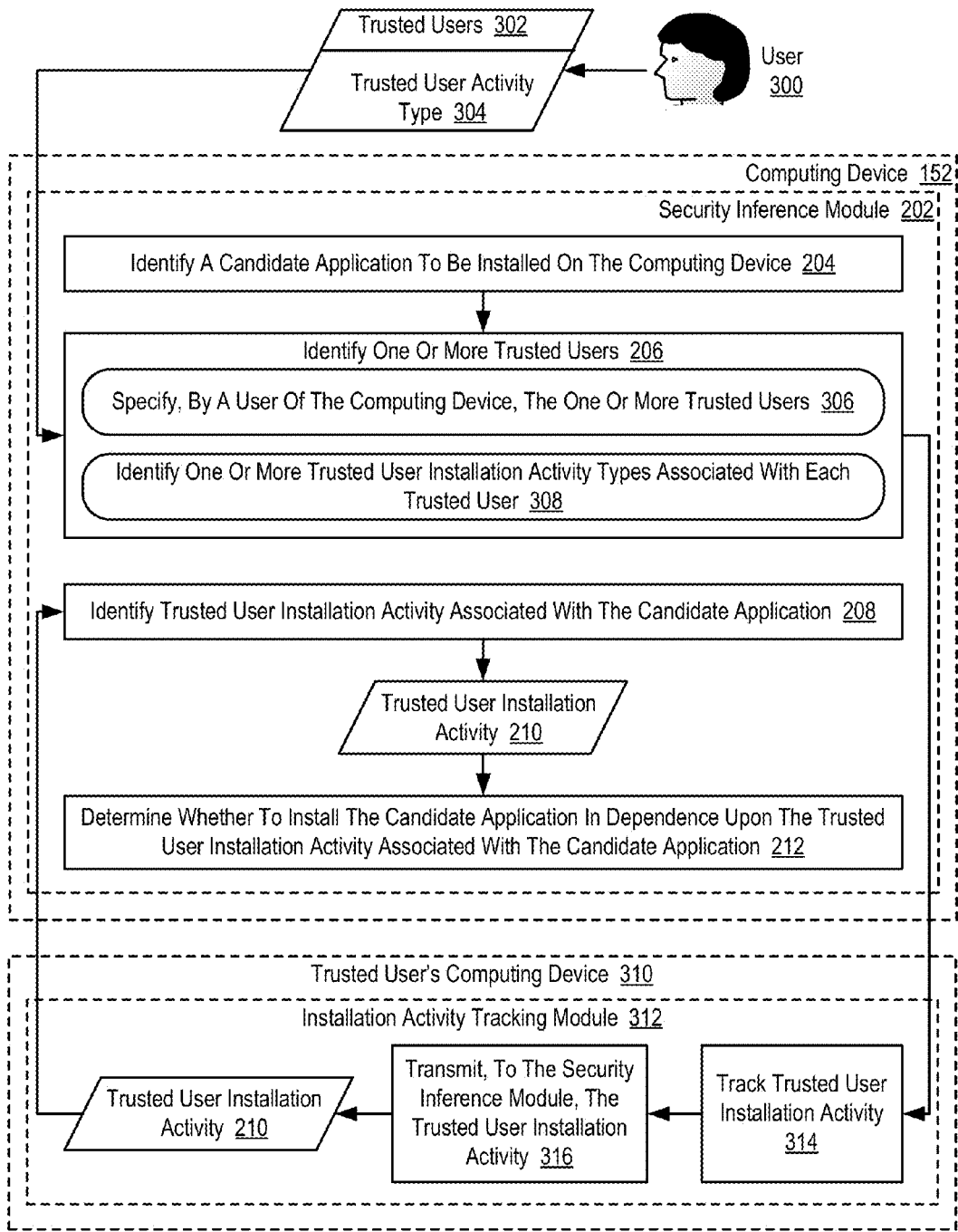
FIG. 3 sets forth a flow chart illustrating an example method for inferring security decisions from trusted users according to embodiments of the present invention.

For further explanation, FIG. 3 sets forth a flow chart illustrating a further example method for inferring security decisions from trusted users according to embodiments of the present invention. The example method of FIG. 3 is similar to the example method of FIG. 2 as it also includes identifying (204) a candidate application to be installed on the computing device (152), identifying (206) one or more trusted users, identifying (208) trusted user installation activity (210) associated with the candidate application, and determining (212) whether to install the candidate application in dependence upon the trusted user installation activity (210) associated with the candidate application.

In the example method of FIG. 3, identifying (206) one or more trusted users can include specifying (306), by a user (300) of the computing device (152), the one or more trusted users (302). In the example method of FIG. 3, specifying (306) the one or more trusted users (302) may be carried out, for example, through the use of a graphical user interface displayed on the computing device (152). Such a user interface can allow the user (300) of the computing device (152) to identify one or more trusted users, one or more computing devices utilized by the trusted users, categories of applications for which a particular trusted user is trusted, and so on. In the example method of FIG. 3, specifying (306) the one or more trusted users (302) may cause the user's computing device (152) to send a request to the computing device (310) requesting that the user of the computing device (310) serve as a trusted user. In such an example, if the user of the computing device (310) agrees to serve as a trusted user, the computing device (310) may respond with an acceptance message, such that the security inference module (202) may register the user of the computing device (310) as a trusted user.

In the example method of FIG. 3, identifying (206) one or more trusted users can also include identifying (308), by the security inference module (202), one or more trusted user installation activity types (304) associated with each trusted user (302). In the example method of FIG. 3, the trusted user installation activity types (304) represent particular application installation activities for which a particular trusted user in trusted. That is, some trusted users may only be trusted with respect to certain activities. For example, a first trusted user may be very knowledgeable as it relates to knowing what gaming applications are trustworthy while a second trusted user may be knowledgeable as it relates to knowing what financial services applications are trustworthy. In such an example, the first trusted user may be identified as only being trusted with respect to the activity of installing and uninstalling gaming applications. Likewise, the second trusted user may be identified as only being trusted with respect to the activity of installing and uninstalling financial services applications. In such an example, the security inference module (202) may only take into account trusted user installed activity (210) of the first user when determining whether to install a gaming application while only taking into account trusted user installed activity (210) of the second user when determining whether to install a financial services application.

The example method of FIG. 3 also includes tracking (314), by an installation activity tracking module (312) on a trusted user's computing device (310), trusted user installation activity (210). In the example method of FIG. 3, the installation activity tracking module (312) may be embodied as a module of computer program instructions executing on computer hardware within the trusted user's computing device (310). Tracking (314) the trusted user installation activity (210) may be carried out, for example, by tracking all information related to the trusted user's activity that is related to the potential installation of applications on the trusted user's computing device (310). For example, the installation activity tracking module (312) on the trusted user's computing device (310) may retain information identifying the particular applications that the trusted user reviewed in an application store, information identifying the particular settings that the trusted user selected when installing an application or a particular type of application, information identifying the particular settings that a trusted user declined to select when installing an application or a particular type of application, information identifying the amount of time that the trusted user had a particular application installed on the trusted user's computing device (310), information identifying the applications that the trusted user uninstalled from the trusted user's computing device (310), and so on. Such information may be tracked (314) by storing the information in computer memory of the trusted user's computing device (310). Such information may alternatively be tracked (314) by associating the information with an identifier of the trusted user, such as a username, that is associated with the trusted user's account in an application store.

The example method of FIG. 3 also includes transmitting (316), from the installation activity tracking module (310) on the trusted user's computing device (310) to the security inference module (202), the trusted user installation activity (210). In the example method of FIG. 3, transmitting (316) the trusted user installation activity (210) may be carried out according to a predetermined schedule such that the trusted user's computing device (310) transmits (316) the trusted user installation activity (210) to the computing device (152) periodically. Alternatively, transmitting (316) the trusted user installation activity (210) may occur only in response to a request for the trusted user installation activity (210) from the computing device (152). In the example method of FIG. 4, the trusted user installation activity (210) may be transmitted (316) from the trusted user's computing device (310) to the computing device (152), for example, over a data communications network such as an IP network, a telephony network, and so on.

Figure 4:
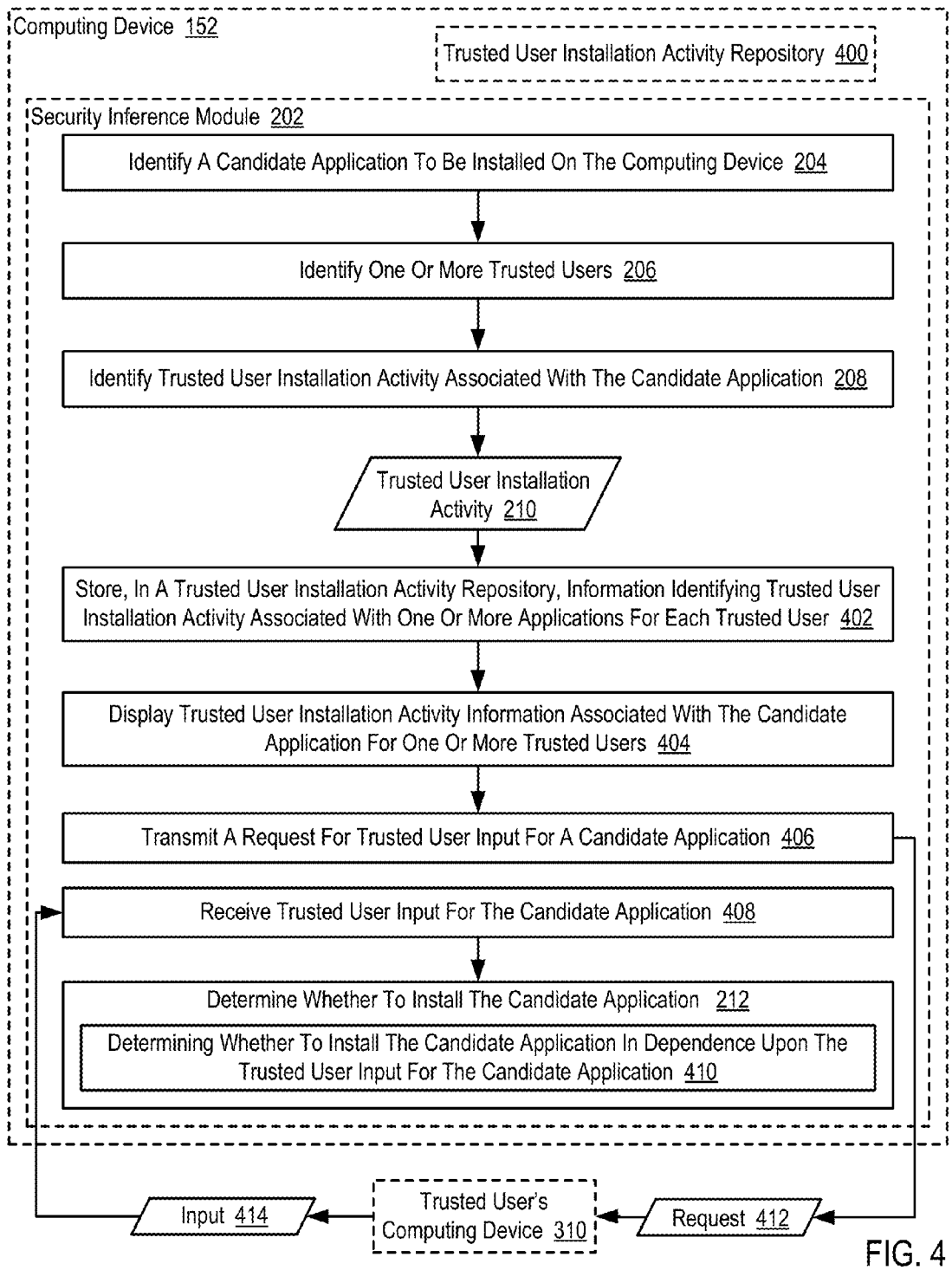
FIG. 4 sets forth a flow chart illustrating an example method for inferring security decisions from trusted users according to embodiments of the present invention.

For further explanation, FIG. 4 sets forth a flow chart illustrating a further example method for inferring security decisions from trusted users according to embodiments of the present invention. The example method of FIG. 4 is similar to the example method of FIG. 2 as it also includes identifying (204) a candidate application to be installed on the computing device (152), identifying (206) one or more trusted users, identifying (208) trusted user installation activity (210) associated with the candidate application, and determining (212) whether to install the candidate application in dependence upon the trusted user installation activity (210) associated with the candidate application.

The example method of FIG. 4 also includes storing (402), by the security inference module (202) in a trusted user installation activity repository (400), information identifying trusted user installation activity (210) associated with one or more applications for each trusted user. In the example method of FIG. 4, trusted user installation activity repository (400) may be embodied, for example, as a database, table, or other data structure stored in computer memory in the computing device (152). Entries in the trusted user installation activity repository (400) can include information identifying particular applications, application types, and the security decisions made with respect to each application by the one or more trusted users. In the example method of FIG. 4, storing (402) information identifying trusted user installation activity (210) associated with one or more applications for each trusted user in the trusted user installation activity repository (400) may be carried out, for example, by creating a new entry in the trusted user installation activity repository (400), by altering an already existing entry in the trusted user installation activity repository (400), and so on.

The example method of FIG. 4 also includes displaying (404), by the security inference module (202), trusted user installation activity information (210) associated with the candidate application for one or more trusted users. In the example method of FIG. 4, displaying (404) trusted user installation activity information (210) associated with the candidate application for one or more trusted users may be carried out, for example, by displaying (404) such information on a display of the computing device (152) when a user of the computing device (152) is in the process of determining whether to install the candidate application.

Consider the example described above in which the computing device (152) is a smartphone that can access an application store that contains applications that are available to be installed on the smartphone. In such an example, the trusted user installation activity information (210) associated with the candidate application may be displayed (404) when the computing device is logged into the application store and has displayed an icon that, when clicked, causes the candidate application to be installed on the computing device (152). In such an example, the trusted user installation activity information (210) associated with the candidate application may be displayed (404) on a touchscreen display of the smartphone. The trusted user installation activity information (210) associated with the candidate application may include, for example, information identifying the trusted users that have installed the candidate application, information identifying the trusted users that have not installed the application, information identifying trusted users that have marked the application as untrustworthy, information identifying trusted users that have marked the application as trustworthy, information identifying the preferences utilized by each trusted user that has the application installed, and so on. Examples such of such preferences can include, for example, whether the candidate application is allowed access to GPS services, whether the candidate application is granted to a user's contacts list, and so on. In such a way, the user of the computing device (152) may be presented with information that can allow the user of the computing device (152) to infer whether their trusted users view the candidate application as being safe.

The example method of FIG. 4 also includes transmitting (406), by the security inference module (202) to a trusted user's computing device (310), a request (412) for trusted user input (414) for the candidate application. In the example method of FIG. 4, the request (412) for trusted user input (414) for the candidate application represents a solicitation for feedback from a trusted user to identify whether the trusted user believes that the candidate application is safe for installing on the computing device (152), a solicitation for feedback from the trusted user to identify what settings and preferences should be applied when installing the candidate application on the computing device (152), and so on. In such an example, the request (412) for trusted user input (414) for the candidate application may include information such as, for example, an identification of the candidate application, an identification of the operating system executing on the computing device (152), an identification of configuration preferences that may be selected when installing the candidate application, and so on.

The example method of FIG. 4 also includes receiving (408), by the security inference module (202) from the trusted user's computing device (310), trusted user input (414) for the candidate application. In the example method of FIG. 4, the trusted user input (414) for the candidate application may be received (408) in response to the trusted user taking some action on the trusted user's computing device (310). In the example method of FIG. 4, the trusted user input (414) for the candidate application may include, for example, a recommendation from the trusted user as to whether the user of the computing device (152) should install the candidate application, an indication of the configuration preferences that the user of the computing device (152) should select when installing the candidate application, and so on. In the example method of FIG. 4, the request (412) and the trusted user input (414) may be exchanged between the computing device (152)

and the trusted user's computing device (310), for example, over a data communications network such an IP network, a telephony network, and so on.

In the example method of FIG. 4, determining (212) whether to install the candidate application can include determining (410) whether to install the candidate application in dependence upon the trusted user input (414) for the candidate application. Determining (410) whether to install the candidate application in dependence upon the trusted user input (414) for the candidate application may be carried out, for example, by examining the trusted user input (414) to determine whether the trusted user recommends or otherwise authorizes installing the candidate application on the computing device (152), by installing the candidate application using the particular security settings or preferences that the trusted user recommends, and so on.

Example embodiments of the present invention are described largely in the context of a fully functional computer system for inferring security decisions from trusted users. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by first program instructions on a first computing device, identifying a candidate application to be installed on the first computing device;
    identifying a trusted user that a user of the first computing device has identified and indicated as being trusted;
    receiving from a second computing device, an indication of installation activity of said candidate application by said trusted user on said second computing device; and
    determining whether to install the candidate application on the first computing device in dependence upon the indication of installation activity.

2. The method of claim 1 further comprising, responsive to determining to install the candidate application, installing the candidate application using preferences of the trusted user.

3. The method of claim 1 identifying the trusted user includes specifying, by the user of the first computing device, the trusted user.

4. The method of claim 1 wherein identifying the trusted user includes identifying types of installation activity associated with each trusted user.

5. The method of claim 1 further comprising storing in a repository, information identifying the installation activity associated with one or more applications for each trusted user.

6. The method of claim 5 further comprising displaying the installation activity associated with the candidate application for said trusted user.

7. The method of claim 1 further comprising:
    transmitting to the second computing device, a request for input from the trusted user and corresponding to the candidate application;
    receiving from the second computing device, the input; and
    wherein determining whether to install the candidate application further comprises determining whether to install the candidate application in dependence upon the input.

* * * * *